(12) United States Patent
Moghtadai et al.

(10) Patent No.: US 11,276,257 B2
(45) Date of Patent: Mar. 15, 2022

(54) SYSTEM AND METHOD FOR ANALYZING VEHICLE DATA

(71) Applicant: The Toronto-Dominion Bank, Toronto (CA)

(72) Inventors: Mehran Moghtadai, Dollard-des-Ormeaux (CA); Oscar Alberto Quijano Xacur, Montreal (CA)

(73) Assignee: The Toronto-Dominion Bank, Toronto (CA)

( * ) Notice: Subject to any disclaimer, the term of this patent is extended or adjusted under 35 U.S.C. 154(b) by 414 days.

(21) Appl. No.: 16/542,000

(22) Filed: Aug. 15, 2019

(65) Prior Publication Data

US 2021/0049840 A1 Feb. 18, 2021

(51) Int. Cl.
| | |
|---|---|
| G06Q 40/08 | (2012.01) |
| G07C 5/08 | (2006.01) |
| G07C 5/00 | (2006.01) |
| G06N 20/00 | (2019.01) |

(52) U.S. Cl.
CPC ............ *G07C 5/085* (2013.01); *G06N 20/00* (2019.01); *G06Q 40/08* (2013.01); *G07C 5/008* (2013.01)

(58) Field of Classification Search
CPC .................................................... G06Q 40/08
See application file for complete search history.

(56) References Cited

U.S. PATENT DOCUMENTS

| | | | |
|---|---|---|---|
| 9,141,582 B1 * | 9/2015 | Brinkmann | G07C 5/0808 |
| 9,141,995 B1 * | 9/2015 | Brinkmann | G01S 19/01 |
| 9,418,382 B2 * | 8/2016 | Gryan | G06Q 40/08 |
| 9,514,582 B2 | 12/2016 | Basir et al. | |
| 9,604,648 B2 | 3/2017 | Tamari et al. | |
| 9,619,203 B2 | 4/2017 | Tamir et al. | |
| 9,672,571 B2 | 6/2017 | Fernandes et al. | |
| 9,754,428 B2 | 9/2017 | Mitchell et al. | |
| 9,754,501 B2 | 9/2017 | Stenneth | |
| 10,269,075 B2 | 4/2019 | Hsu-Hoffman et al. | |
| 2013/0138460 A1 | 5/2013 | Schumann, Jr. et al. | |
| 2014/0195272 A1 | 7/2014 | Sadiq et al. | |
| 2016/0239925 A1 | 8/2016 | Biemer et al. | |
| 2018/0107932 A1* | 4/2018 | Pandurangarao | G06N 7/00 |
| 2019/0043135 A1 | 2/2019 | Kawamoto et al. | |

FOREIGN PATENT DOCUMENTS

CN 104599347 B 11/2016

\* cited by examiner

*Primary Examiner* — Edward Chang
(74) *Attorney, Agent, or Firm* — CPST Intellectual Property Inc.; Brett J. Slaney

(57) ABSTRACT

A system and method are provided for analyzing vehicle data. The method is executed by a device having a processor and includes obtaining a set of vehicle data via a data interface, the set of vehicle data comprising a plurality of location measurements and a corresponding plurality of speed measurements for a vehicle. The method also includes associating the plurality of location measurements and the plurality of speed measurements with a geographic area to generate a geographic map image. The method also includes applying an image processing technique to the map image to identify at least one path and analyzing the at least one path and data associated with the geographic area, to identify at least one driving pattern within the geographic area. The method also includes providing an indication of the at least one driving pattern to contribute to a risk assessment associated with a driver of the vehicle.

20 Claims, 7 Drawing Sheets

SYSTEM AND METHOD FOR ANALYZING VEHICLE DATA

TECHNICAL FIELD

The following relates generally to analyzing vehicle data.

BACKGROUND

Usage-based insurance (UBI) is a type of vehicle insurance that may be used to set or adjust the cost of a premium paid by a user based on factors such as the driving habits of the user, the type of vehicle being used, how often the vehicle is used, or where the vehicle is being used, to name a few. UBI may also be referred to as "pay as you drive" or "pay how you drive" insurance. UBI programs typically require a device to be installed in or coupled to a vehicle or require an application to be installed in another device such as a smart phone that is meant to be located in the vehicle while the user is driving. Such devices or applications are often referred to as telematics devices or telematics applications and are normally connectable to a telematics system that collects driver data for several users.

With the collected data, a UBI program may analyze certain variables for a UBI model. For example, speed, acceleration, and distance variables may be determined from the collected data and used in a UBI model to rate the driver. Many auto rating variables for such UBI models are not causal. Instead, many of these variables serve as a proxy to the cause of a change to the variable. Using proxy variables can increase the variance of the estimates and thus the overall premiums calculated in a UBI program.

Issues with auto rating variables can lead to issues in fairness in that, for example, not all young drivers are necessarily high-risk drivers. Moreover, using variables such as gender, age, territory, and marital status can lead to potential issues with discrimination. Due to these factors, some regions control or even forbid the use of such variables in determining insurance premiums.

BRIEF DESCRIPTION OF THE DRAWINGS

Embodiments will now be described with reference to the appended drawings wherein.

DETAILED DESCRIPTION

Figure 1:
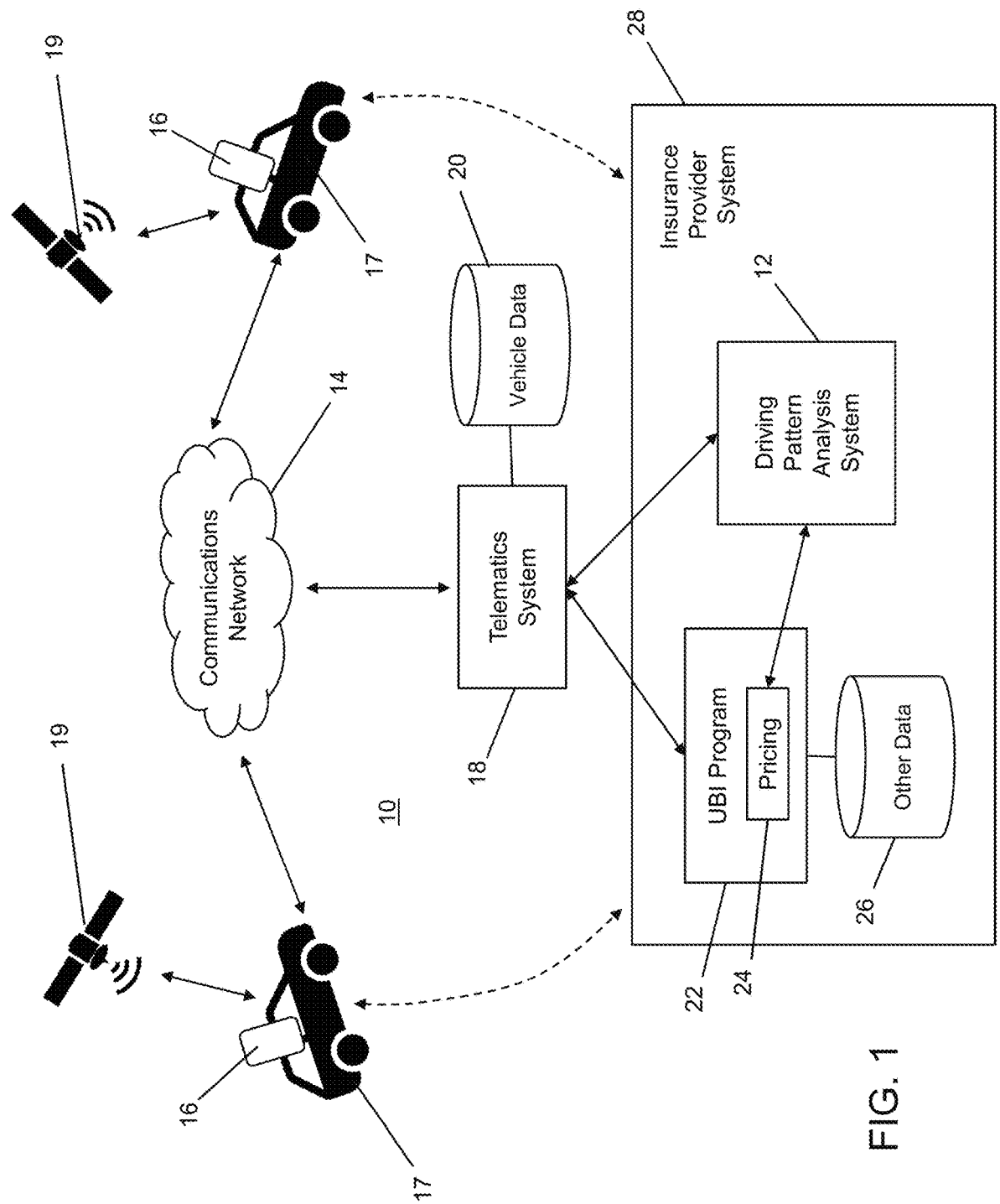
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

A cause of risk in providing auto insurance can be linked to driving habits. Driving habits can be accurately portrayed using a customer's vehicle position, speed, and acceleration at each point in time. Such data points can be collected, for example, on a second-by-second basis and used to assess risk. This provides an opportunity to improve the pricing scheme used in a UBI system in order to be fairer and more accurate. A system and method may be provided that leverage such data to create a risk assessment process based on long term driving habits. Image processing and analysis techniques may be used to identify and analyze driving paths and speed maps of users in order to assess risks related to driving patterns. Deep learning may also be applied to build a model based on the paths and the data associated with these paths (e.g., frequency of use, speed at different portions, etc.). The assessed risks can be provided to or used by a pricing team to apply an improved pricing scheme, e.g., by ignoring traditional constraints and to view driving patterns in context rather than focusing on individual data points like total speed, number of accelerations, etc.

Certain example systems and methods described herein enable vehicle data that has been collected in a telematics system to be used in determining driving patterns, e.g., for UBI pricing. In one aspect, there is provided a device for analyzing vehicle data. The device includes a processor, a data interface coupled to the processor, and a memory coupled to the processor. The memory stores computer executable instructions that when executed by the processor cause the processor to obtain a set of vehicle data via the data interface, the set of vehicle data comprising a plurality of location measurements and a corresponding plurality of speed measurements for a vehicle. The computer executable instructions also cause the processor to associate the plurality of location measurements and the plurality of speed measurements with a geographic area to generate a geographic map image and apply an image processing technique to the map image to identify at least one path. The computer executable instructions also cause the processor to analyze the at least one path and data associated with the geographic area, to identify at least one driving pattern within the geographic area, and provide an indication of the at least one driving pattern to contribute to a risk assessment associated with a driver of the vehicle.

In another aspect, there is provided a method of analyzing vehicle data. The method is executed by a device having a processor and includes obtaining a set of vehicle data via a data interface, the set of vehicle data comprising a plurality of location measurements and a corresponding plurality of speed measurements for a vehicle. The method also includes associating the plurality of location measurements and the plurality of speed measurements with a geographic area to generate a geographic map image and applying an image processing technique to the map image to identify at least one path. The method also includes analyzing the at least one path and data associated with the geographic area, to identify at least one driving pattern within the geographic area and providing an indication of the at least one driving pattern to contribute to a risk assessment associated with a driver of the vehicle.

In another aspect, there is provided non-transitory computer readable medium for analyzing vehicle data. The computer readable medium includes computer executable instructions for obtaining a set of vehicle data via a data interface, the set of vehicle data comprising a plurality of location measurements and a corresponding plurality of speed measurements for a vehicle. The computer readable medium further includes computer executable instructions for associating the plurality of location measurements and the plurality of speed measurements with a geographic area to generate a geographic map image and applying an image processing technique to the map image to identify at least one path. The computer readable medium further includes computer executable instructions for analyzing the at least one path and data associated with the geographic area, to identify at least one driving pattern within the geographic area and providing an indication of the at least one driving pattern to contribute to a risk assessment associated with a driver of the vehicle.

In certain example embodiments, the device may generate or update a model with the at least one path using a machine learning algorithm and use the model to identify the at least one driving pattern. The device may obtain the model, the model having been generated from vehicle data for a plurality of vehicles and update the model with the at least one path. The vehicle data collected from the plurality of vehicles may comprise at least one similar path traveled by another vehicle.

In certain example embodiments, the at least one path may include a driving path traveled by the vehicle. The map image may include at least one repeated driving path that is distinguishable by the image processing technique from at least one other driving path to be indicative of a higher frequency of use.

In certain example embodiments, the at least one path can include a vehicle trip with a plurality of portions each identifying respective vehicle speed data. The vehicle speed data may include an acceleration value.

In certain example embodiments, the device may communicate via the data interface with a telematics system connected to the vehicle for collecting the vehicle data. The device may communicate with a database in the telematics system to obtain the vehicle data. The device may communicate with a telematics device used or having been used in the vehicle to obtain the vehicle data.

In certain example embodiments, the indication of the at least one driving pattern used in the risk assessment may be used to calculate an insurance premium for a usage-based insurance program. The indication of the at least one driving pattern may also be combined with one or more additional factors in calculating the insurance premium. An additional factor may include a road type associated with the at least one path, the road type being determinable from data associated with the geographic area.

In certain example embodiments, the plurality of location measurements each may include a latitude and a longitude, the set of vehicle data having been generated at least in part by a global positioning system receiver positioned in the vehicle while collecting the vehicle data.

FIG. 1 illustrates an exemplary computing environment 10 in which a driving pattern analysis system 12 communicates with a telematics system 18 to obtain vehicle data 20 collected by the telematics system 18 from in-vehicle telematics devices 16 over a communications network 14. The in-vehicle telematics devices 16 may include devices that are embedded in a vehicle 17 (e.g., in-vehicle navigation or infotainment systems), devices that are coupled to a data port in the vehicle 17 (e.g., dongles or other custom devices connected to an interface such as an on-board diagnostics (OBD) connector), or personal devices associated with a driver or other occupant of the vehicle and having a telematics application running thereon (e.g., smartphones, gaming devices, tablets, etc.). The telematics devices 16 of any of these types, are capable of determining data and information that is indicative of the location and speed of the vehicle 17 at various points in time. For example, in the configuration shown in FIG. 1, the devices 16 are in communication with a global positioning system (GPS) having a number of GPS satellites 19 that provide location-based information to an application running on or connected to the devices 16. However, it can be appreciated that other types of devices 16 such as dongles connected to an OBD port in the vehicle 17 may have access to at least speed information that is calculated by the vehicle 17.

In the example configuration shown in FIG. 1, the driving pattern analysis system 12 is an entity within an insurance provider system 28. However, it can be appreciated that the driving pattern analysis system 12 may also be provided as a standalone entity, such as an independent service that can communicate with multiple insurance provider systems 28. Similarly, while the telematics system 18 is shown in FIG. 1 as a separate entity, the telematics system 18 may also be integrated into the insurance provider system 28 or a UBI program 22 within the insurance provider system 28. The driving pattern analysis system 12 in this example is separate from and coupled to at least a pricing module 24 of the UBI program 22. The UBI program 22 may also have access to other data 26 within the insurance provider system 28, such as customer data. The UBI program 22, driving pattern analysis system 12, and telematics system 18 are delineated as shown in FIG. 1 for illustrative purposes and such a configuration should not be considered limiting.

Details of the insurance provider system 28 are omitted for ease of illustration and it will be appreciated that the insurance provider system 28 can be associated with a variety of business types, such as insurance providers, financial institutions having insurance products, government entities, private lenders, etc.

The vehicle data 20 that is collected by the telematics system 18 may include any data that the telematics devices 16 are capable of collecting. For example, the telematics devices 16 may typically collect at least latitude and longitude values (collectively indicative of a location) and speed values. Other values such as acceleration can be collected if available or computed based on the location and speed values.

The telematics system 18 and driving pattern analysis system 12 can include one or more devices such as servers capable of communicating with each other and/or the network 14 and with the insurance provider system 28.

The driving pattern analysis system 12 may have access to the vehicle data 20 directly or via the telematics system 18. Such vehicle data 20 may be accessed via an Internet or other remote data connection such as an application programming interface (API).

In certain aspects, telematics device 16, telematics system 18, driving pattern analysis system 12, and UBI program 22 can include, but are not limited to, a data communication device; and these may include a mobile or smart phone, a laptop computer, a tablet computer, a notebook computer, a hand-held computer, a personal digital assistant, an embedded device, a virtual reality device, an augmented reality device, third party portals, a personal computer, and any additional or alternate computing device, and may be operable to transmit and receive data across communication network 14.

Communication network 14 may include a telephone network, cellular, and/or data communication network to connect different types of devices as will be described in greater detail below. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet). While the configuration shown in FIG. 1 illustrates the UBI program 22 and driving pattern analysis system 12 communicating with the communications network 14 via the telematics system 18, this is done for illustrative purposes and these devices may also connect directly to communications network 14. For example, as shown in dashed lines in FIG. 1, the insurance provider system 28 may have a customer relationship with the users of the telematics devices 16 and/or vehicles 17 and therefore may communicate with those users separately, which may include communications over the communications network 14 or another network or medium (not shown).

The computing environment 10 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the telematics devices 16, vehicles 17, telematics system 18, UBI program 22, driving pattern analysis system 12, and insurance provider system 28. The cryptographic server may be used to protect the data or results of the data by way of encryption for data protection, digital signatures or message digests for data integrity, and by using digital certificates to authenticate the identity of the users and devices within the computing environment 10, to inhibit data breaches by adversaries. It can be appreciated that various cryptographic mechanisms and protocols can be chosen and implemented to suit the constraints and requirements of the particular deployment of the computing environment 10 as is known in the art.

Figure 2:
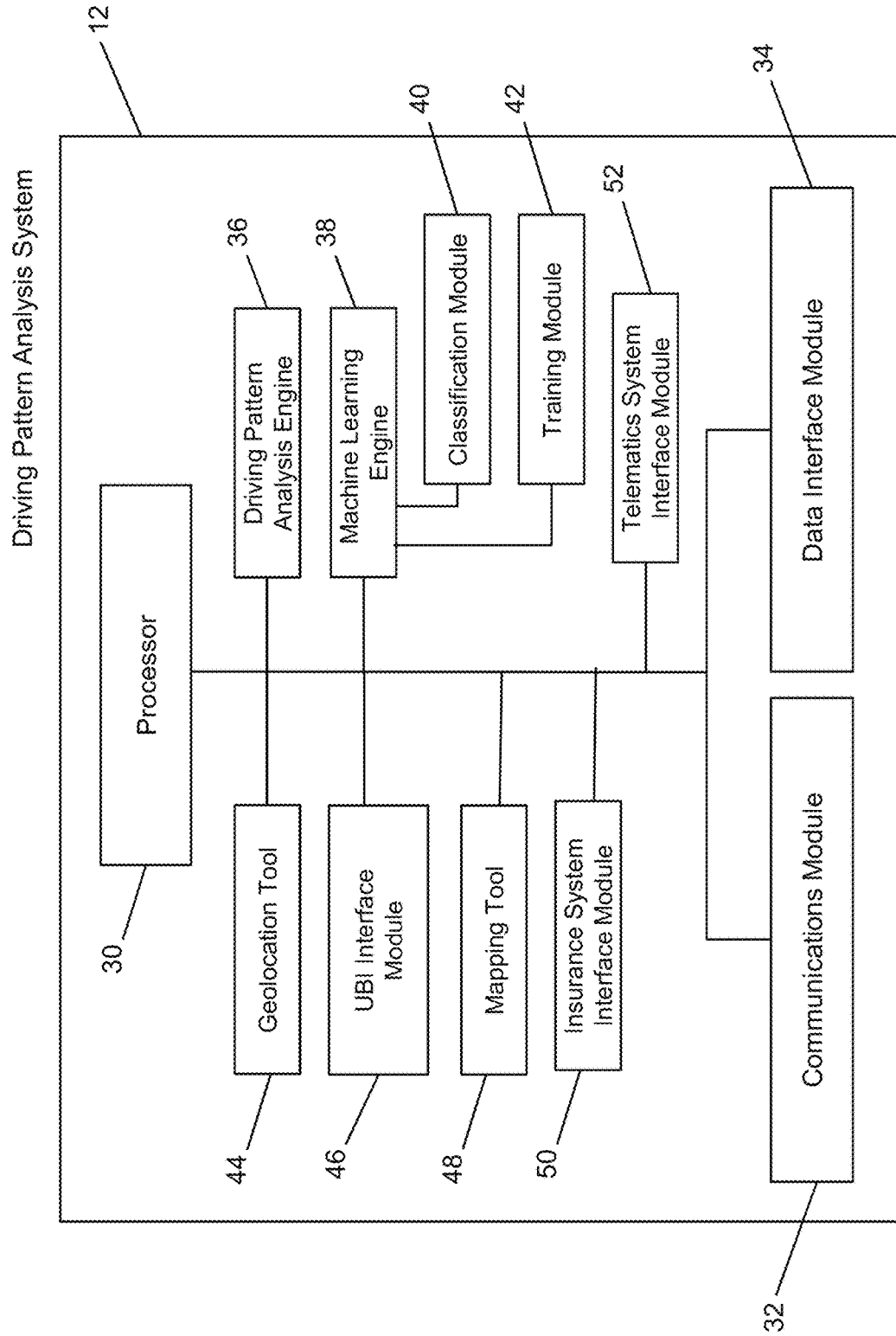
FIG. 2 is a block diagram of an example configuration of a driving pattern analysis system.

In FIG. 2, an example configuration of the driving pattern analysis system 12 is shown. In certain embodiments, the driving pattern analysis system 12 may include one or more processors 30, a communications module 32, and a data interface module 34 for interfacing with the vehicle data 20 to receive or retrieve vehicle data 20 associated with a customer, client, or vehicle 17 for which a driving pattern analysis is being conducted. The data interface 34 may also be used to interface with the UBI program 22 to obtain the other data 26, or to interface directly with the other data 26 by having the appropriate permissions or credentials issued by the insurance provider system 28. Communications module 32 enables the driving pattern analysis system 12 to communicate with one or more other components of the computing environment 10, such as telematics system 18, UBI program 22 (e.g., pricing module 24), vehicles 17, and telematics devices 16, via a bus or other communication network, such as the communication network 14. While not delineated in FIG. 2, the driving pattern analysis system 12 includes at least one memory or memory device that can include a tangible and non-transitory computer-readable medium having stored therein computer programs, sets of instructions, code, or data to be executed by processor 30. FIG. 2 illustrates examples of modules, tools and engines stored in memory on the driving pattern analysis system 12 and operated by the processor 30. It can be appreciated that any of the modules, tools, and engines shown in FIG. 2 may also be hosted on the telematics system 18 or by the UBI program 22 (or other component of the insurance provider system 28) as discussed above.

In the example embodiment shown in FIG. 2, the driving pattern analysis system 12 includes a driving pattern analysis engine 36 for analyzing and evaluating driving patterns of vehicles 17 using the vehicle data 20 and other data associated with a geographic area in which the vehicle 17 travels. The driving pattern analysis system 12 may also include a machine learning engine 38, a classification module 40, a training module 42, a geolocation tool 44, a UBI interface module 46, a mapping tool 48, an insurance system interface module 50, and a telematics system interface module 52.

The machine learning engine 38 is used by the driving pattern analysis engine 36 (or "analysis engine 36" for brevity) to generate and train models 350 (see also FIG. 8) to be used in evaluating vehicle data 20 and associated geolocation or mapping data, for determining driving patterns that can be used in UBI pricing. The analysis engine 36 may utilize or otherwise interface with the machine learning engine 38 to both classify data currently being analyzed to generate the models, and to train classifiers using data that is continually being processed and accumulated by the telematics devices 16 and telematics system 18.

The machine learning engine 38 may also perform operations that classify the vehicle data 20 (or information derived from the vehicle data 20) in accordance with corresponding classifications parameters, e.g., based on an application of one or more machine learning algorithms to the data. The machine learning algorithms may include, but are not limited to, a one-dimensional, convolutional neural network model (e.g., implemented using a corresponding neural network library, such as Keras®), and the one or more machine learning algorithms may be trained against, and adaptively improved using, elements of previously classified profile content identifying expected datapoints. Subsequent to classifying the data, the machine learning engine 38 may further process each data point to identify, and extract, a value characterizing the corresponding one of the classification parameters, e.g., based on an application of one or more additional machine learning algorithms to each of the data points. By way of the example, the additional machine learning algorithms may include, but are not limited to, an adaptive natural language processing algorithm that, among other things, predicts starting and ending indices of a candidate parameter value within each data point, extracts the candidate parameter value in accordance with the predicted indices, and computes a confidence score for the candidate parameter value that reflects a probability that the candidate parameter value accurately represents the corresponding classification parameter. As described herein, the one or more additional machine learning algorithms may be trained against, and adaptively improved using, the locally maintained elements of previously classified data. Classification parameters may be stored and maintained using the classification module 40, and training data may be stored and maintained using the training module 42.

In some instances, classification data stored in the classification module 40 may identify one or more parameters, e.g., "classification" parameters, that facilitate a classification of corresponding elements or groups of recognized data points based on any of the exemplary machine learning algorithms or processes described herein. The one or more classification parameters may correspond to parameters that can identify expected and unexpected data points for certain types of data.

In some instances, the additional, or alternate, machine learning algorithms may include one or more adaptive, natural-language processing algorithms capable of parsing each of the classified portions of the data being examined and predicting a starting and ending index of the candidate parameter value within each of the classified portions. Examples of the adaptive, natural-language processing algorithms include, but are not limited to, natural-language processing models that leverage machine learning processes or artificial neural network processes, such as a named entity recognition model implemented using a SpaCy® library.

Examples of these adaptive, machine learning processes include, but are not limited to, one or more artificial, neural network models, such as a one-dimensional, convolutional neural network model, e.g., implemented using a corresponding neural network library, such as Keras®. In some instances, the one-dimensional, convolutional neural network model may implement one or more classifier functions or processes, such a Softmax® classifier, capable of predicting an association between a data point and a single classification parameter and additionally, or alternatively, multiple classification parameters.

Based on the output of the one or more machine learning algorithms or processes, such as the one-dimensional, convolutional neural network model described herein, machine learning engine 38 may perform operations that classify each of the discrete elements of the vehicle and/or geographic area-related data being examined as a corresponding one of the classification parameters, e.g., as obtained from classification data stored by the classification module 40.

The outputs of the machine learning algorithms or processes may then be used by the analysis engine 36 to generate and train models and to use such models to determine driving patterns from data and information observed or derived from the vehicle data 20 and/or related or associated geolocation or mapping data for a relevant geographic area. The analysis engine 36 may also use a set of rules, a weighted formula or any other statistical or mathematical function or tool to evaluate the vehicle data 20 and related geolocation/mapping data, or information derived therefrom.

Referring again to FIG. 2, the UBI interface module 46 may be used to provide one or more outputs based on the results generated by the analysis engine 36. Example outputs include indicators of driving patterns and/or graphical outputs that can be used to visualize driving paths and/or speed paths identified using image generation and image processing techniques employed by (or input to) the analysis engine 36 and used to assess driving patterns. The graphical output may also be displayed for a user or administrator or may be used internally by the driving pattern analysis system 12 or pricing module 24 with respect to driving patterns and pricing derived therefrom. That is, graphical outputs generated by the driving pattern analysis system 12 may be displayed to a user or may be machine-processed without a need to be displayed.

The geolocation tool 44 may be used by the driving pattern analysis system 12 to identify geolocation data associated with location measurements taken in a geographic area. For example, the driving pattern analysis system 12 can identify a geographic area from a set of location measurements in the vehicle data 20 and use the geolocating tool 44 to identify additional entities and features within that geographic area. The mapping tool 48 may also be used by the driving pattern analysis system 12 to obtain or generate mapping data associated with the geographic area, including existing roadways, intersections, landmarks, and topographical features. For example, when associating location data with the geographic area, the mapping tool 48 may be used to generate a visual map on which the location measurements of a vehicle 17 and the associated geolocation data can be plotted. This image or map generation operation can be performed by the mapping tool 48 or by the analysis engine 36, or both. It can be appreciated that the geolocation tool 44, mapping tool 48, and analysis engine 36 are shown as being delineated in FIG. 2 for illustrative purposes only and the associated functionality may also be integrated into the analysis engine 36 or be provided by a location-based application or service accessible to the analysis engine 36. The geolocation tool 44 and/or mapping tool 48 may also be provided by one or more third party APIs that are accessed by the driving pattern analysis system 12 to integrate geolocating and mapping services into the functionality provided by the analysis engine 36.

The insurance system interface module 50 provides one or more interfaces to the insurance provider system 28, e.g., to enable the driving pattern analysis system 12 to access or interface with the other data 26 stored by the insurance provider system 28. The insurance system interface module 50 can also be used to access or otherwise interact or communicate with internal programs, devices, or systems of the insurance provider system 28 that can provide any suitable information that can be used in analyzing driving patterns, e.g., customer information.

The telematics system interface module 52 is shown in FIG. 2 for illustrative purposes and the functionality thereof may be provided by the UBI interface module 46 or insurance system interface module 50. The telematics system interface module 52 enables the driving pattern analysis system 12 to interface with the telematics system 18 (e.g., directly or via the UBI program 22) to obtain vehicle data 20.

Figure 3:
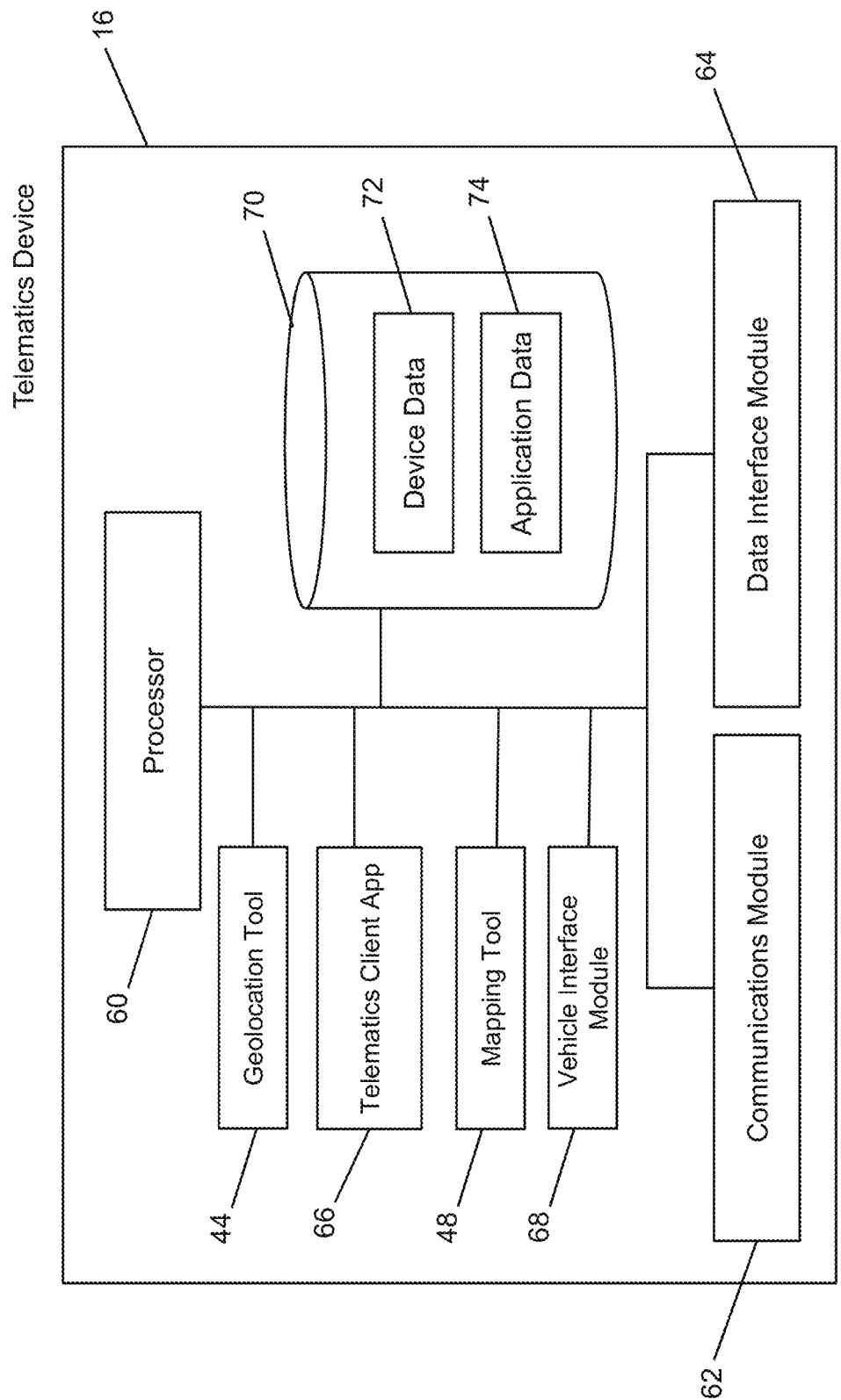
FIG. 3 is a block diagram of an example configuration of a telematics device.

In FIG. 3, an example configuration of the telematics device 16 is shown. In certain embodiments, the telematics device 16 may include one or more processors 60, a communications module 62, a data interface module 64, a telematics client app 66, and a data store 70 storing device data 72 and application data 74. Communications module 62 enables the telematics device 12 to communicate with one or more other components of the computing environment 10, such as a vehicle 17, the telematics system 18, driving pattern analysis system 12, and insurance provider system 28 (or one of its components), via a bus or other communication network, such as the communication network 14. While, not delineated in FIG. 3, the telematics device 16 includes at least one memory or memory device that can include a tangible and non-transitory computer-readable medium having stored therein computer programs, sets of instructions, code, or data to be executed by processor 60. FIG. 3 illustrates examples of modules and applications stored in memory on the telematics device 16 and operated by the processor 60. It can be appreciated that any of the modules and applications shown in FIG. 3 may also be hosted externally by the telematics system 18 and be available to the telematics device 16, e.g., via the communications module 62. It can be appreciated that the data interface module 64 is shown in FIG. 3 for illustrative purposes only and the functionality thereof may also be provided by the communications module 62, e.g., when raw location and speed data to be collected by the telematics device 16 is available via a connection to the communications network 14.

In the example embodiment shown in FIG. 3, the telematics device 16 includes a telematics client app 66 for enabling the user of the telematics device 16 to initiate and operate a UBI application in association with the insurance provider system 28. The telematics client app 66 may include a display module for rendering GUIs and other visual output on a display device such as a display screen, and an input module for processing user or other inputs received at the telematics device 16, e.g., via a touchscreen, input button, transceiver, microphone, keyboard, etc. The telematics device 16 may also include the same or a similar geolocation tool 44 and/or mapping tool 48 used by the driving pattern analysis system 12. When used by the telematics device 16, the geolocation tool 44 or mapping tool 48 may include a module or application that is configured to act as a GPS receiver for obtaining GPS data by communicating with one or more GPS satellites 19. This can be done using or in conjunction with the communications module 32 or data interface module 34 of the telematics device 16. It can be appreciated that the geolocation tool 44 and mapping tool 48 are shown in both FIGS. 2 and 3 to illustrate that such services may be available to both the client- and server-based devices for use in mapping geographic areas and identifying geolocated entities and vehicle data 20 in a map interface.

The telematics device 16 may also include other applications not shown in FIG. 3, such as a web browser application for accessing Internet-based content, e.g., via a mobile or traditional website. The data store 70 may be used to store device data 72, such as, but not limited to, an IP address or a MAC address that uniquely identifies telematics device 16 within environment 10. The data store 70 may also be used to store application data 74, such as, but not limited to, login credentials, user preferences, cryptographic data (e.g., cryptographic keys), etc.

Figure 4:
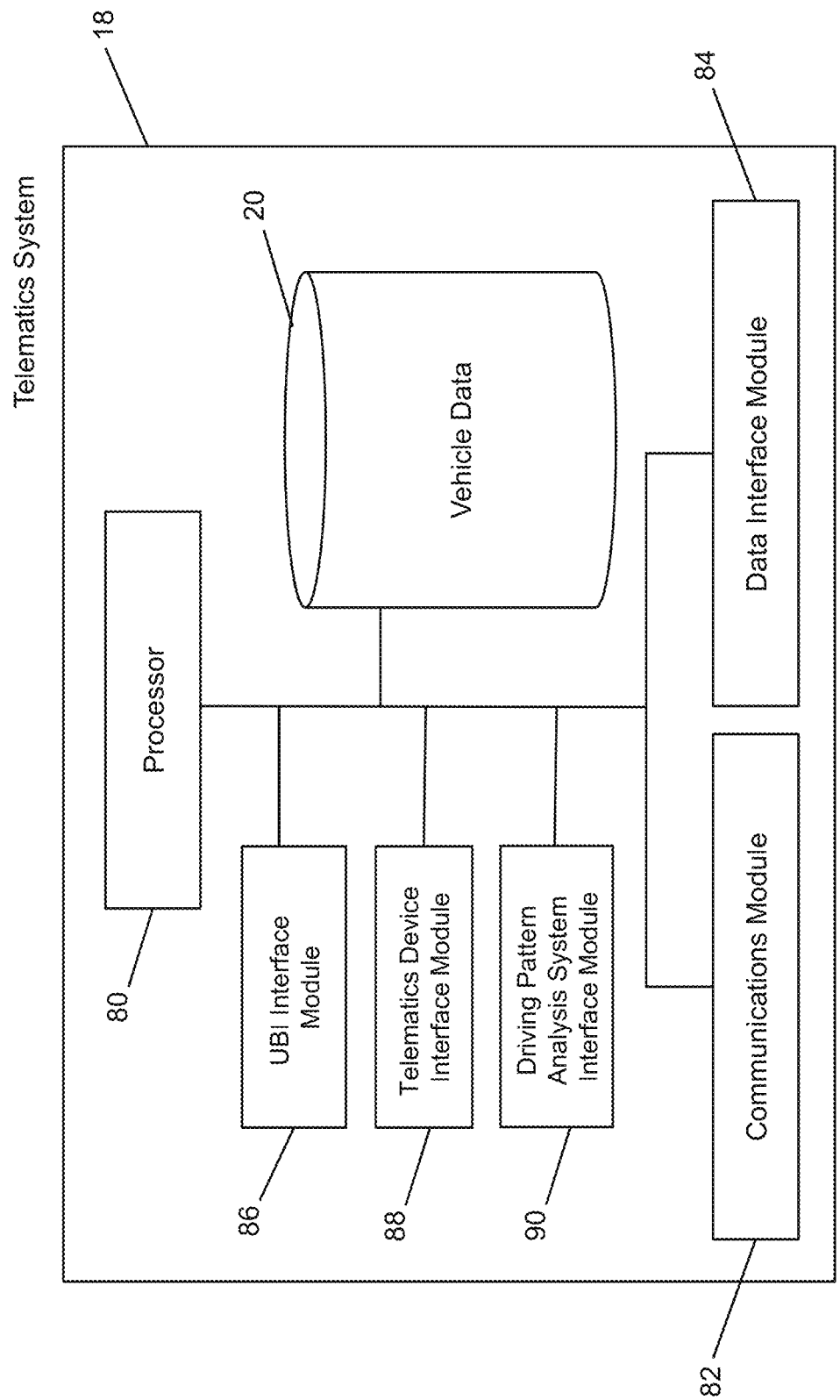
FIG. 4 is a block diagram of an example configuration of a telematics system.

In FIG. 4, an example configuration of the telematics system 18 is shown. In certain embodiments, the telematics system 18 may include one or more processors 80, a communications module 82, a data interface module 84, a UBI interface module 86, a telematics device interface module 88, a driving pattern analysis system interface module 90, and a data storage for the vehicle data 20. Communications module 82 enables the telematics system 18 to communicate with one or more other components of the computing environment 10, such as a vehicle 17, the telematics device 16, driving pattern analysis system 12, and insurance provider system 28 (or one of its components), via a bus or other communication network, such as the communication network 14. While not delineated in FIG. 4, the telematics system 18 includes at least one memory or memory device that can include a tangible and non-transitory computer-readable medium having stored therein computer programs, sets of instructions, code, or data to be executed by processor 80. FIG. 4 illustrates examples of modules and applications stored in memory on the telematics system 18 and operated by the processor 60.

The UBI interface module 86 may be the same or similar to the UBI interface module 46 used by the driving pattern analysis system 12 to interface with the UBI program 22 to provide access to collected vehicle data 20 for one or more users. The telematics device interface module 88 may be used to interface and communicate with one or more telematics devices 16 either directly or via a connection with the vehicle 17. The driving pattern analysis system interface module 90 may be used to interface and communicate with the driving pattern and analysis system 12 directly. It can be appreciated that the modules 86, 88, and 90 are shown as being delineated in FIG. 4 for illustrative purposes only and such modules could be combined into any one or more module or application while providing the functionality illustrated herein. The vehicle data 20 is shown as being integrated in the telematics system 18 in FIG. 4 but may also be located externally to the telematics system 18 as shown in FIG. 1. For example, the vehicle data 20 can be stored by a third-party cloud-based storage service and accessed by entities with the appropriate permissions and credentials, entities such as the telematics system 18, insurance provider system 28, driving pattern analysis system 12, etc.

It will be appreciated that only certain modules, applications, tools and engines are shown in FIGS. 2 to 4 for ease of illustration and various other components would be provided and utilized by the driving pattern analysis system 12, telematics device 16, and telematics system 18 as is known in the art.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the telematics device 16, telematics system 18, insurance provider system 28, driving pattern analysis system 12, UBI program 22, pricing module 24, or accessible or connectable thereto. Any application or module herein described may be implemented using computer readable/executable instructions that may be stored or otherwise held by such computer readable media.

As indicated above, the vehicle data 20 and data associated with a geographic area (e.g., geolocation/mapping data) may be used by the driving pattern analysis system 12 to identify driving patterns and analyze those driving patterns to inform a pricing module 24 for the UBI program 22 in determining UBI-based insurance pricing. In this example embodiment, the vehicle data 20 includes at least location measurements and associated time stamps for each location measurement. The vehicle data 20 may also typically include speed measurements, however, it can be appreciated that speed and other measurements such as acceleration can be computed by the driving pattern analysis system 12 from the location measurements and the time stamps (i.e., by determining how long it takes for the vehicle 17 to travel a certain distance). The vehicle data 20 may be raw data such as latitude, longitude and speed measurements with associated time stamps. This vehicle data 20 is associated with the mapping and geolocation data for an associated geographic area in which the vehicle data 20 was captured to provide additional context and to permit a deeper analysis alongside other traditional variables used in UBI pricing.

Figure 5:
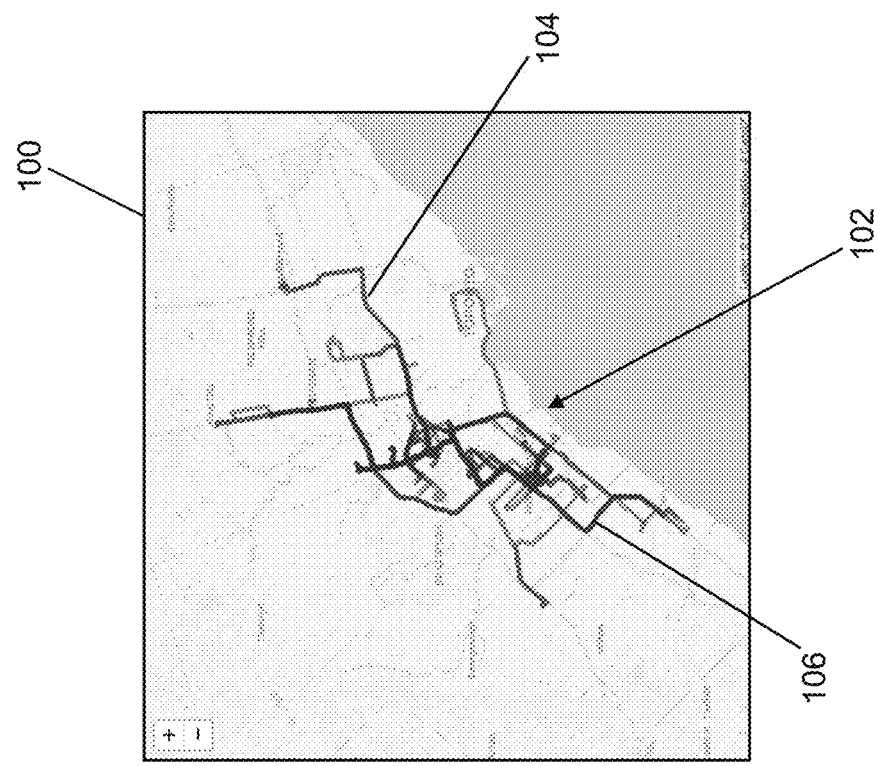
FIG. 5 is an example of a graphical output displaying driving paths in a geographic area.

Referring to FIG. 5, a graphical output 100 is shown which includes a geographic map image 102 that may be generated from the mapping and geolocation data provided by the geolocation tool 44 and mapping tool 48. The vehicle data 20 that is associated with a vehicle 17 and telematics device 16 may be associated with the geographic map image 102 and can be used to visualize one or more driving paths 104. For example, the raw location data may be plotted on the map image 102 and resolved or otherwise corrected to align with preexisting roadways. Such plotting can be performed by the geolocation tool 44, mapping tool 48 or analysis engine 36 by implementing an image rendering or processing technique to generate visual representations of one or more paths 104 driven by the vehicle 17. Each data point plotted along a path 104 has an associated location, speed, and time stamp, which enables multiple types of paths to be visualized, as discussed below.

As shown in FIG. 5, darkened driving paths 106 can be identified when individual driving paths 104 are repeated or otherwise include overlapping portions. By tracing out driving paths 104 as shown in FIG. 5, the analysis engine 36 of the driving pattern and analysis system 12 can apply one or more image analysis techniques to the driving paths 104 to assess a driving pattern. For example, the number of darkened paths 106 can be identified to determine daily or frequent routes, geolocation data can be referenced to determine a type of road or heavy traffic zone, or the number of paths or overall distance can be used to determine driving frequency, etc.

Figure 6:
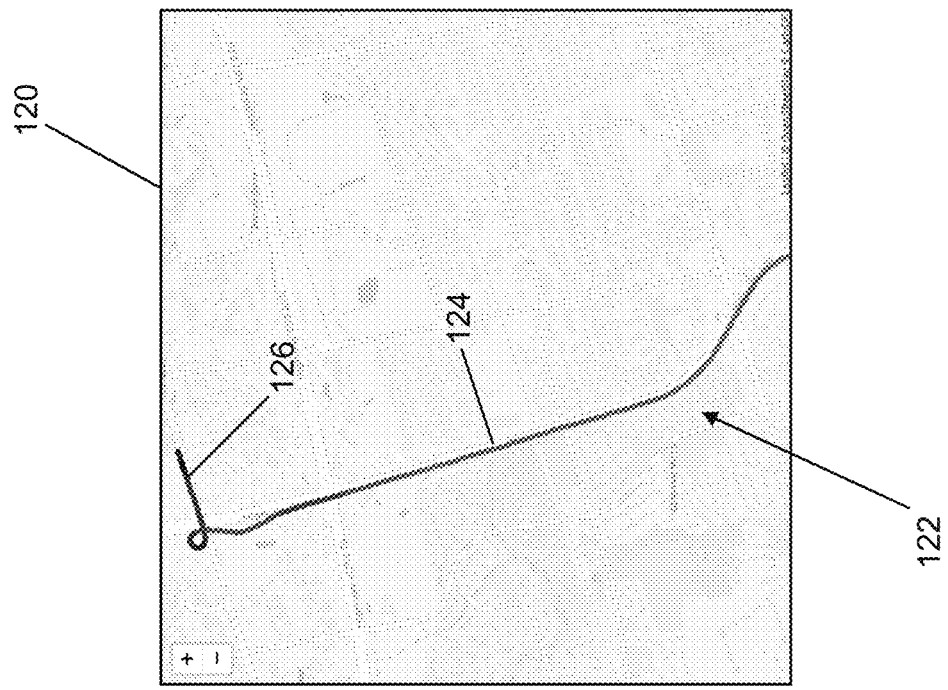
FIG. 6 is an example of a graphical output displaying speed maps in a geographic area.

Turning now to FIG. 6, a graphical output 120 is shown for another type of image analysis. In this example, the graphical output 120 includes a geographic map image 122 that, as above, may be generated from the mapping and geolocation data provided by the geolocation tool 44 and mapping tool 48. The vehicle data 20 for a particular driving path 124 may be shown with a number of segments 126 differentiated by color or shade to indicate speed variations over the driving path 124. That is, each driving path 124 (or driving paths 104 taken from image 100) can be separately analyzed to determine driving patterns such as speed and acceleration within the path 124. By plotting the paths 124 as shown in FIG. 6, the analysis engine 36 of the driving pattern and analysis system 12 can apply one or more image analysis techniques to the speed pattern to determine a driving pattern. As such, it can be appreciated that the driving paths 104, 124 and speed patterns can be collectively referred to as data inputs to determine a driving pattern or can be considered driving patterns themselves.

It can also be appreciated that the graphical outputs shown in FIGS. 5 and 6 may be linked such that any driving path 104 shown in FIG. 5 may be selected to initiate the graphical output 120 in FIG. 6 for that specific driving path 104 to show speed data as path 124.

The graphical outputs 100, 102 generated by the analysis engine 36 may be analyzed by the analysis engine 36 itself or may be provided to the pricing module 24 as additional variable with any additional analysis outputs generated by the analysis engine 36. That is, the driving patterns may be determined directly by the analysis engine 36 or may be indicated or identified by the analysis engine 36 for the pricing module 24 or UBI program 22 more generally for a subsequent step in a pricing calculation. As such, operations described herein may be performed by one or more of the elements of the computing environment 10 according to the principles discussed herein.

Figure 7:
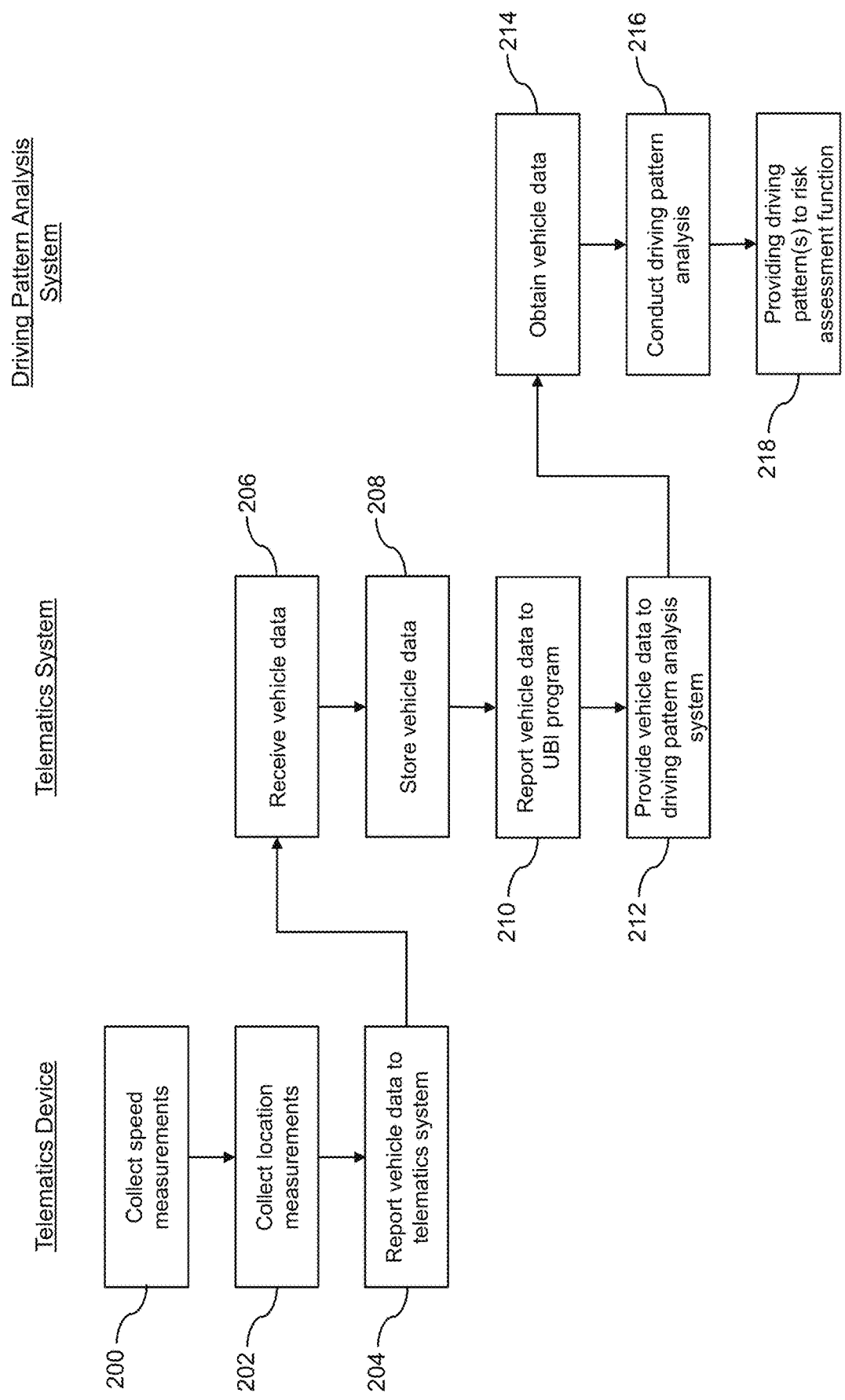
FIG. 7 is a flow diagram of an example of computer executable instructions for collecting vehicle data for a driving pattern analysis.

Referring to FIG. 7, an example embodiment of computer executable instructions for collecting vehicle data 20 for a driving pattern analysis is shown. The example shown in FIG. 7 is based on the example configuration for the computing environment 10 in FIG. 1 in which the telematics system 18 collects vehicle data 20 from telematics devices 16. At block 200, the telematics device 16 collects speed measurements with associated time stamps, which are associated with a vehicle 17 and driver/user. At block 202, the telematics device 16 collects location measurements with associated time stamps, e.g., via access to a GPS system connected to the telematics device 16 or vehicle 17. The telematics device 16 in this example is configured to report a set of vehicle data 20 to the telematics system 18 at block 204. It can be appreciated that the frequency of reporting vehicle data 20 at block 204 can vary based on user preferences, system preferences or constraints such as available bandwidth or data communication restrictions. For example, the telematics device 16 can locally store its collected vehicle data 20 and report such data as frequently as in real-time or near-real-time, or on a less frequent basis such as intra-daily, daily or weekly.

The set of vehicle data 20 collected by the telematics device 16 is received by the telematics system 18 at block 206 and the received vehicle data 20 is stored at block 208. The vehicle data 20 that is received and stored may be associated with a user or vehicle account in the datastore used for the vehicle data 20. The telematics system 18 in this example is configured to report vehicle data 20 collected from one or more telematics devices 16 to the UBI program 22 at block 210. For example, the telematics system 18 may be responsible for collecting data from a number of customers associated with the UBI program 22 for the insurance provider system 28 and may be instructed to report the vehicle data 20 to the UBI program 22. The UBI program 22 may store the received vehicle data 20 with the other data 26 within the insurance provider system 28. The UBI program 22 may also be provided with a permission and/or credential to access the vehicle data 20 directly from the datastore or service utilized by the telematics system 18.

In this example embodiment, the telematics system 18 may also provide the vehicle data 20 to the driving pattern analysis system 12 at block 212, either by sending the data thereto, or by providing access via a credential to access the datastore or service used by the telematics system 18 or via the access provided to the UBI program 22. As such, it can be appreciated that blocks 210 and 212 may be executed using a single operation or communication between the telematics system 18 and the insurance provider system 28. For example, the telematics system 18 may be configured to send an alert to the UBI program 22 and/or driving pattern analysis system 12 when a new set or new sets of vehicle data 20 are available for processing.

The driving pattern analysis system 12 obtains the vehicle data 20 at block 214, either directly or via the UBI program 22 in this example. The vehicle data 20 thus obtained can be used to conduct a driving pattern analysis at block 216 as discussed above and described in greater detail below. Based on the analysis or analyses conducted at block 216, the driving pattern analysis system 12 can provide one or more driving patterns to a risk assessment function, such as that used by the pricing module 24 of the UBI program 22. As indicated above, the driving pattern(s) can be indicated using various output types, including graphical outputs such as those shown in FIGS. 5 and 6. The outputs may also include numerical or statistical values, scores, weights, or rankings that can show, on a relative scale, a degree of driving behavior, either positive or negative, that can be used in calculating or adjusting an insurance premium.

Figure 8:
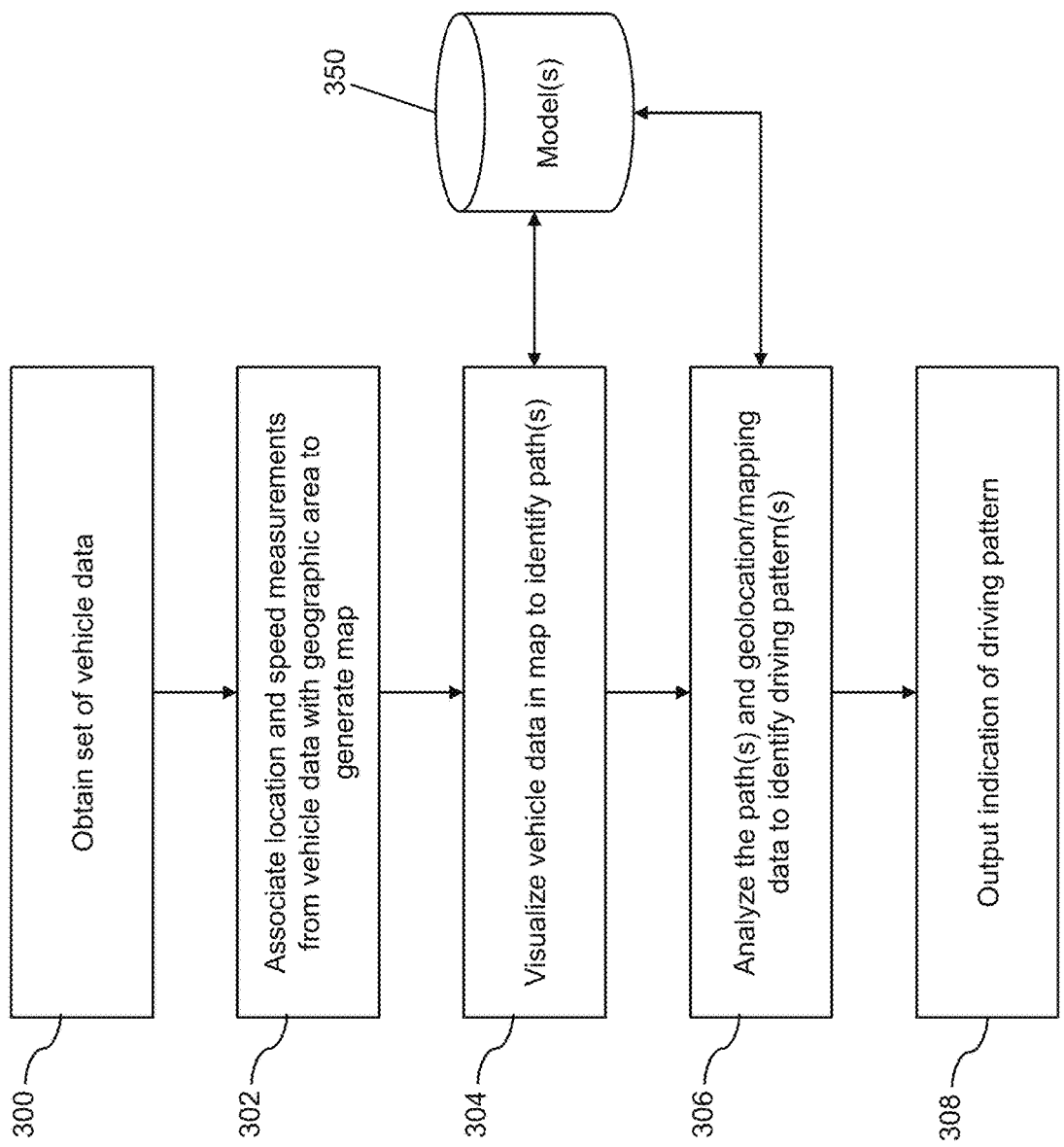
FIG. 8 is a flow diagram of an example of computer executable instructions for analyzing vehicle data.

Referring to FIG. 8, an example embodiment of computer executable instructions for analyzing vehicle data 20 is shown. The operations illustrated in FIG. 8 may be executed by the analysis engine 36 of the driving pattern analysis system 12 according to the configuration shown in FIG. 2 within the computing environment 10 shown in FIG. 1, however, the principles may apply in other configurations.

At block 300, the analysis engine 36 obtains the set of vehicle data 20 that is to be analyzed, e.g., by obtaining a set of vehicle data 20 associated with a single vehicle 17 (or a single driver of multiple vehicles 17) covering a certain period of time (e.g., a week, a month, a quarter, etc.).

At block 302 the geolocation tool 44 and mapping tool 48 may be used to generate a map image 102, 122 and location and speed measurements may be associated with the map image 102, 122 to generate a graphical output 100, 120. This can include resolving or adjusting datapoints to fit within predetermined driving paths such as roadways to allow driving paths 104, 124 to be rendered using one or more image processing techniques in block 304, as discussed above. That is, the graphical output 100, 120 visualizes the vehicle data 20 within the map image 102, 122 such that one or more vehicle-related paths are identified. For example, a collection of successive location measurements can trace out a driving path as shown in FIG. 5, and a collection of speed measurements within a driving path can be used to highlight variations in speed along that path as shown in FIG. 6. In this way, significant amounts of raw data generated by the telematics system 18 can be efficiently and conveniently assembled and graphically visualized to allow image-based techniques to assess driving patterns and/or driving habits.

At block 306 the path(s) and associated geolocation/mapping data are analyzed by the analysis engine 36 to identify one or more driving patterns. The geolocation/mapping data may include, for example, posted road speeds, road type (e.g., city street versus freeway), elevation, time of day (e.g., sunset and sunrise conditions), geographic area (e.g., rural versus urban), traffic data, weather data, etc. This geolocation/mapping data can then be associated with the actual driven path(s) and the speed(s) used by the vehicle 17 along those paths to enable the analysis engine 36 and/or the pricing module 24 to generate deeper insights. For example, frequently used driving paths may be indicative of a daily commute, and road types may be indicative of highway versus city driving. Moreover, other factors such as traffic and weather can be accounted for with the time stamp information associated with the location and speed measurements.

The path(s) identified at block 304 and the analyses conducted at block 306 can be influenced by and/or contribute to one or more models 350 that may be trained and updated by the machine learning module 38 of the driving pattern analysis system 12 using vehicle data 20 having been generated by multiple vehicles 17. By analyzing driving patterns for a multitude of vehicles, certain observations and inferences can be determined that can benefit subsequent analyses. For example, relatively high vehicle speeds along a certain driving path 124 can be observed as an anomaly and potentially negative driving pattern when compared to a sample set of driving paths 124 from other drivers that recorded a relatively lower speed. Similarly, historical data from the same driver can be used, tracked, and modeled over time to determine if improvements or adjustments have been made in driving patterns and driving habits that can inform the pricing module 24.

At block 308, an output indicative of a driving pattern may be provided by the driving pattern analysis system 12 to the pricing module 24. As discussed above, this can include providing graphical outputs 100, 120 for subsequent use by the pricing module 24, variable scores for certain parameters as determined by the analysis engine 36 using the graphical outputs 100, 120, or a combination of such outputs. That is, the pricing module 24 and driving pattern analysis system 12 are delineated in the present example for illustrative purposes and such elements may be integral with each other and/or work in concert to assess and identify driving patterns or habits that can be used as additional variables in assessing risk related to such driving patterns.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A device for analyzing vehicle data, the device comprising:
 a processor;
 a data interface coupled to the processor; and
 a memory coupled to the processor, the memory storing computer executable instructions that when executed by the processor cause the processor to:
   obtain a set of vehicle data via the data interface, the set of vehicle data comprising a plurality of location measurements and a corresponding plurality of speed measurements for a vehicle;
   associate the plurality of location measurements and the plurality of speed measurements with a geographic area to generate a geographic map image;
   apply an image processing technique to the map image to identify at least one path, the at least one path comprising a driving path traveled by the vehicle, wherein the map image comprises at least one repeated driving path that is distinguishable by the image processing technique from at least one other driving path to be indicative of a higher frequency of use;
   generate or update a model with the at least one path using a machine learning algorithm;

analyze the at least one path and data associated with the geographic area using the model, to identify at least one driving pattern within the geographic area; and provide an indication of the at least one driving pattern to contribute to a risk assessment associated with a driver of the vehicle.

2. The device of claim 1, wherein the computer executable instructions further cause the processor to:
obtain the model, the model having been generated from vehicle data for a plurality of vehicles; and
update the model with the at least one path.

3. The device of claim 2, wherein the vehicle data collected from the plurality of vehicles comprises at least one similar path traveled by another vehicle.

4. The device of claim 1, wherein the at least one path comprises a vehicle trip with a plurality of portions each identifying respective vehicle speed data.

5. The device of claim 4, wherein the vehicle speed data comprises an acceleration value.

6. The device of claim 1, wherein the computer executable instructions further cause the processor to:
communicate via the data interface with a telematics system connected to the vehicle for collecting the vehicle data.

7. The device of claim 6, wherein the device communicates with a database in the telematics system to obtain the vehicle data.

8. The device of claim 6, wherein the device communicates with a telematics device used or having been used in the vehicle to obtain the vehicle data.

9. The device of claim 1, wherein the indication of the at least one driving pattern used in the risk assessment is used to calculate an insurance premium for a usage-based insurance program.

10. The device of claim 9, wherein the indication of the at least one driving pattern is combined with one or more additional factors in calculating the insurance premium.

11. The device of claim 10, wherein an additional factor comprises a road type associated with the at least one path, the road type being determinable from data associated with the geographic area.

12. The device of claim 1, wherein the plurality of location measurements each comprise a latitude and a longitude, the set of vehicle data having been generated at least in part by a global positioning system receiver positioned in the vehicle while collecting the vehicle data.

13. A method of analyzing vehicle data, the method executed by a device having a processor, and comprising:
obtaining a set of vehicle data via a data interface, the set of vehicle data comprising a plurality of location measurements and a corresponding plurality of speed measurements for a vehicle;
associating the plurality of location measurements and the plurality of speed measurements with a geographic area to generate a geographic map image;
applying an image processing technique to the map image to identify at least one path, the at least one path comprising a driving path traveled by the vehicle, wherein the map image comprises at least one repeated driving path that is distinguishable by the image processing technique from at least one other driving path to be indicative of a higher frequency of use;
generating or updating a model with the at least one path using a machine learning algorithm;
analyzing the at least one path and data associated with the geographic area using the model, to identify at least one driving pattern within the geographic area; and
providing an indication of the at least one driving pattern to contribute to a risk assessment associated with a driver of the vehicle.

14. The method of claim 13, wherein the at least one path comprises a vehicle trip with a plurality of portions each identifying respective vehicle speed data.

15. A non-transitory computer readable medium for analyzing vehicle data, the computer readable medium comprising computer executable instructions for:
obtaining a set of vehicle data via a data interface, the set of vehicle data comprising a plurality of location measurements and a corresponding plurality of speed measurements for a vehicle;
associating the plurality of location measurements and the plurality of speed measurements with a geographic area to generate a geographic map image;
applying an image processing technique to the map image to identify at least one path, the at least one path comprising a driving path traveled by the vehicle, wherein the map image comprises at least one repeated driving path that is distinguishable by the image processing technique from at least one other driving path to be indicative of a higher frequency of use;
generating or updating a model with the at least one path using a machine learning algorithm;
analyzing the at least one path and data associated with the geographic area using the model, to identify at least one driving pattern within the geographic area; and
providing an indication of the at least one driving pattern to contribute to a risk assessment associated with a driver of the vehicle.

16. The method of claim 13, further comprising:
obtaining the model, the model having been generated from vehicle data for a plurality of vehicles; and
updating the model with the at least one path.

17. The method of claim 16, wherein the vehicle data collected from the plurality of vehicles comprises at least one similar path traveled by another vehicle.

18. The method of claim 13, wherein the at least one path comprises a vehicle trip with a plurality of portions each identifying respective vehicle speed data.

19. The method of claim 18, wherein the vehicle speed data comprises an acceleration value.

20. The method of claim 13, further comprising:
communicating via the data interface with a telematics system connected to the vehicle for collecting the vehicle data.

* * * * *